Figure 1:
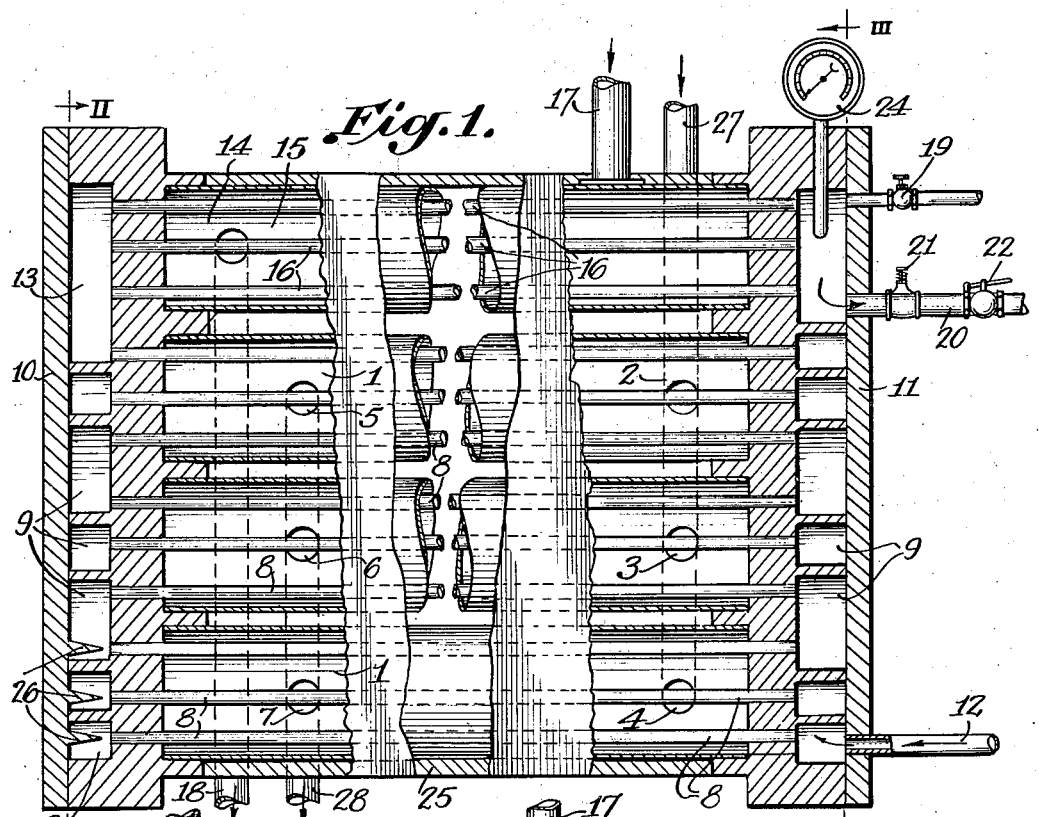

March 25, 1941. L. DE JONGE 2,236,470

DEVICE FOR STERILIZING AND COOLING LIQUIDS

Original Filed Feb. 18, 1935

Inventor.
L. de Jonge
By C. F. Wenderoth
Attorney

Patented Mar. 25, 1941

2,236,470

UNITED STATES PATENT OFFICE 2,236,470

DEVICE FOR STERILIZING AND COOLING LIQUIDS

Leonardus de Jonge, Rotterdam, Netherlands, assignor to the Syndicate "Jozijdhoff," Rotterdam, Netherlands, constituted by the members: George Jacob van Zijderveld, Jr., George Jacob van Zijderveld, Sr., Johannes van 't Hoff, and Leonardus de Jonge Original application February 18, 1935, Serial No. 7,143. Divided and this application May 10, 1938, Serial No. 207,138. In the Netherlands February 20, 1934

1 Claim. (Cl. 257—234)

My invention relates to apparatus for sterilizing putrefiable liquids under pressure.

This application is a division of Ser. No. 7,143 filed February 18, 1935, Patent No. 2,173,411 issued Sept. 19, 1939.

In the known apparatus for the sterilization of putrefiable liquids, particularly of milk, the liquid is conducted through a heating element, comprising a plurality of narrow tubes together forming a single conduit, the said tubes being housed in a casing provided with a feed line and a discharge line for the heating medium and, having a cooler connected with the heating element, and brought from room temperature to a high temperature within a very short time.

With these apparatus, however, one is not certain that the liquid is really exposed for a sufficient period to the higher temperatures which are absolutely necessary for killing the spores, so that there always remains the possibility of obtaining a non-sterile product. This uncertainty is entirely removed by the application of the apparatus according to my invention.

For this purpose the novel apparatus comprises at least two heating elements, the supply of the heating medium to each of the said elements being separately adjustable, and the individual tubes in each heating element being mutually connected by means of comparatively wide mixing chambers. In this manner the liquid after leaving each heating tube and before it enters into the next heating tube, is given a whirling motion, which causes the entire mass of liquid to obtain the same temperature.

In the known sterilizing apparatus, on the contrary, the individual heating tubes are either connected by means of bent pieces having the same diameter, which makes that the core of the flow of liquid always remains in the same place and consequently receives the least share of the heat, so that the same temperature will not be present in all parts of the flow of liquid, or by grooves formed in the end members of the casing housing the narrow tubes.

The said whirling motion may still be promoted in the apparatus according to my invention by providing in the mixing chambers a pointed projection opposite to and located in the axis of the heating tubes.

With the apparatus according to my invention it is possible to completely sterilize within a short time by a single treatment the most widely varying kinds of beverages such as beer, lemonade, cider, fruit juices, milk, cream, skimmed milk, etc. so that they will retain their original taste, color and composition as with said apparatus it becomes possible to individually regulate the temperature in the separate heating elements by means of the adjustable supply of the heating medium to each element. In this way the liquid to be sterilized is certainly subjected for a sufficient long period of time to the elevated temperatures.

My invention will now be further explained with reference to the drawing which by way of example represents an apparatus for sterilizing milk and milk products.

In the said drawing

Figure 2:
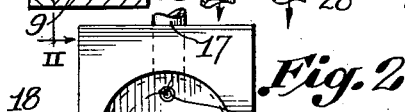
Figure 3:
Figure 4:
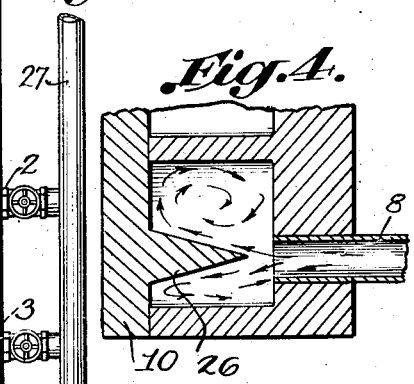

Fig. 1 represents a view of the apparatus according to my invention, part of it being a vertical cross section, Fig. 2 is a view according to the line II—II in Fig. 1 the closing piece being removed and Fig. 3 is a similar view according to the line III—III in Fig. 1 and Fig. 4 represents a detail on a somewhat enlarged scale.

The apparatus according to Fig. 1 contains three heating elements comprising passages 1, for example tubes of a large diameter in which are located the narrow heating tubes 8. The said passages 1 are each connected with a steam supply tube 27 by means of the branch tubes 2, 3, 4 and with a steam exhaust pipe 28 by means of the branch tubes 5, 6, 7, the said branch tubes 2, 3, 4 each being provided with a cock or faucet.

By adjusting the said cocks it is possible to regulate the supply of steam to the heating elements and consequently their temperature. The diameter of the tubes 8 in the present case is 11 millimetres.

The outlet ends of the heating tubes 8 open into mixing chambers 9 to which the next tube is connected, so that the liquid to be sterilized is given a whirling motion in the said mixing chambers and will circulate through the tubes along a tortuous path. The mixing chambers are closed by two common closing pieces 10 and 11 in which latter closing piece there is provided a supply tube 12 for feeding the liquid to be sterilized into the lower tube 8. The end of the last narrow tube 8 which is located in the upper passage is connected here by means of a mixing chamber 13 to the cooler 14 which in the present embodiment is arranged above the heating elements. The said cooler consists of a passage 15 in which are provided five cooling tubes 16 through which the milk is flowing in countercurrent with the cooling water. This cooling water is supplied by a tube 17 and leaves the cooler through a tube 18. The closing member 11 is provided with an air evacuation cock or faucet 19 and with a discharge tube 20 for the cooled liquid. The said tube 20 is provided with a pressure regulating valve 21 and with a safety valve 22. The complete apparatus is housed in a casing 25. In order to promote the whirling motion in the mixing chambers 9 projections 26 may be provided on the closing plates 10 and 11 opposite the mouths of the tubes 8.

Such a projection is represented on a somewhat enlarged scale in Fig. 4 in which the preferably sharp point of the projection is located exactly in the axis of the tube 8. The whirling motion produced by this projection is indicated in the figure by the arrows.

The mixing chambers 9 are of the configuration shown in Figures 2 and 3. Referring to these figures the tubes 8 are provided with arrows indicating the flow of milk. Each mixing chamber 9 has a tube leading milk thereto and a tube leading milk therefrom. The mixing chamber 13 of the cooler 14 is shaped as shown in Fig. 2 with one tube 8 leading milk thereto and five tubes 16 leading milk therefrom. The opposite mixing chamber is shaped as shown in Fig. 3 at the top thereof and the milk in the tubes 16 flows toward the observer as indicated by the arrows.

Therefore as clearly indicated in Figs. 2 and 3 the milk coming from the supply tube 12 flows through the lowermost tube 8 from right to left as shown in Fig. 1 and then returns through the tube 8 connected to the lowermost tube 8 by the lower mixing chamber 9 as shown in Fig. 2. The course of the milk through the sterilizer is easily followed by referring to the arrows shown in Figs. 2 and 3.

After the entire apparatus has been sterilized first, for instance by means of steam, fresh steam, e. g. under a pressure of about 8 atmospheres is introduced into the passages 1. The milk to be treated is then pressed likewise under a pressure of about 8 atmospheres into the tube 12 and will then flow with a great velocity of approximately 6 metres per second through the tubes 8.

The said tubes are each having a length of about 3.25 metres here, so that the milk will have flowed through the entire tube system 8 in approximately 8 seconds. The steam supply to the three passages 1 is regulated so that the temperature of the milk after leaving the last tube 8 of the lower heating element will be about 135° C. against about 145° C. upon leaving the last tube 8 of the intermediate heating element and about 150°–160° C. after leaving the last tube of the upper heating element. The said temperatures may be read from the thermometers placed in the relative mixing chambers, one of which thermometers is denoted in the drawing by 23. In the same manner the pressure in the mixing chambers and at the end of the cooler may be read from recording pressure gauges. The last recording pressure gauge is indicated in the drawing by 24.

When the pressure under which the milk is fed to the tube system through the tube 12 is as high as about 8 atmospheres the pressure regulating valve 21 in the tube 20 is adjusted so that at the end of the cooler the pressure will be about 6.5 atm.

In the tube system 8 the milk consequently is only for a few seconds exposed to the temperature required for completely killing all germs and spores, which in the case of milk preferably is as high as 140–160° C., but which always must be above 130° C.

In the cooler 14 the milk is cooled to about 80° C. and finally filled into sterilized bottles through the pipe line 20 connected to the feed line of the filling device. Milk treated in this manner will keep for an indefinite period of time without spoiling.

For sterilizing other liquids, such as, e. g. beer, heating to a lower temperature, for instance to about 90–100° C. will be sufficient and the tube system may be smaller in length, so that two heating elements will suffice.

It is obvious that it is necessary for beer and other beverages containing carbonic acid cooling is to be effected down to a temperature of about 0° C., in order to prevent the carbonic acid present in the beverage to start effervescing and being lost during filling.

It is an especially surprising feature that according to my present invention cream and even skimmed milk may be perfectly sterilized without any detriment.

I claim:

An apparatus for sterilizing putrefiable liquids by means of heat comprising a plurality of outer tubes, a plurality of inner tubes located within said outer tubes, each of said outer tubes having a controllable inlet and outlet for a heating medium, relatively spacious chambers interconnecting said inner tubes, and pointed projections in said chambers positioned at substantially the axes of said inner tubes for promoting a whirling motion in the liquid passing therethrough.

LEONARDUS DE JONGE.